United States Patent [19]

Sharp et al.

[11] Patent Number: 4,457,586
[45] Date of Patent: Jul. 3, 1984

[54] ATTACHABLE ANTIGLARE REAR VIEW MIRROR

[75] Inventors: Bernard C. Sharp, White Plains, N.Y.; Raymond J. Evans, Navatuck, Conn.

[73] Assignee: Parker-Hannifin Corporation, Shelton, Conn.

[21] Appl. No.: 400,737

[22] Filed: Jul. 22, 1982

[51] Int. Cl.³ .............................................. G02B 17/00
[52] U.S. Cl. ...................................... 350/281; 350/278
[58] Field of Search ............... 350/281, 282, 283, 278, 350/279; 74/501 M

[56] References Cited

U.S. PATENT DOCUMENTS 3,522,987 8/1970 Janosky et al. ...................... 350/281
4,293,191 10/1981 Kim ...................................... 248/467

Primary Examiner—John K. Corbin
Assistant Examiner—Paul M. Dzierzynski
Attorney, Agent, or Firm—Albert C. Johnston; Thaddius J. Carvis

[57] ABSTRACT

Disclosed is a rear view mirror assembly of the antiglare, "day or night", type which is readily attachable, such as to the face of an existing rear view mirror in a motor vehicle.

The mirror assembly comprises a mirror unit (26) operable between two angularly displaced reflective positions. A cam lever (24) comprising first and second cams (48, 54) cooperates with first and second cam followers (36, 38) to move the mirror unit between the two positions. The mirror assembly preferably includes adhesive strip means (22) to secure the assembly to a support. The cam followers are preferably located on the rear wall (40) of the mirror unit such that vertical movement of the cam lever pivots the mirror unit between the operable positions, one for day driving and one for night driving. This simple, vertical actuating movement minimizes forces tending to displace the mirror assembly from the support.

5 Claims, 7 Drawing Figures

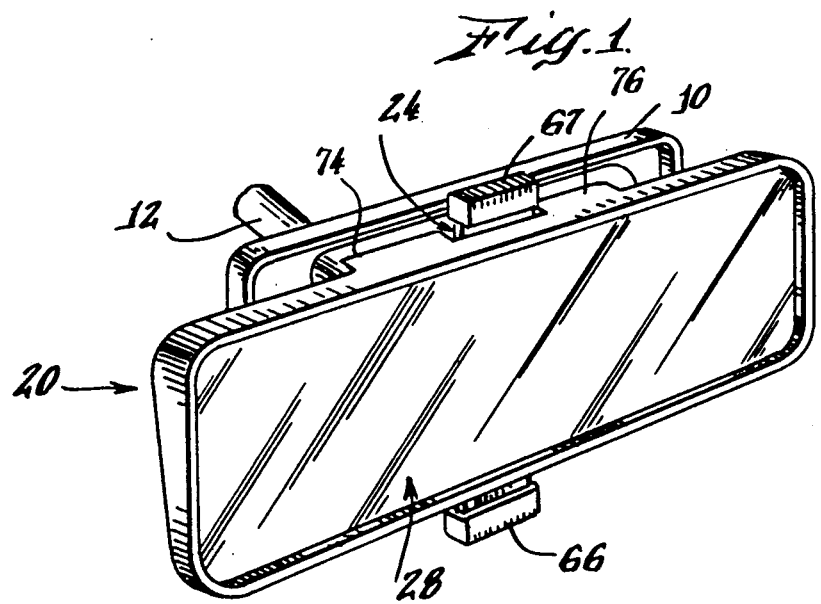
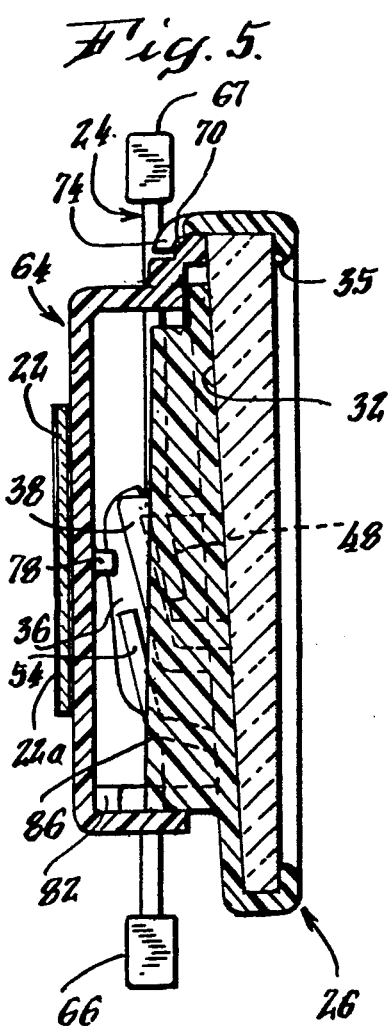
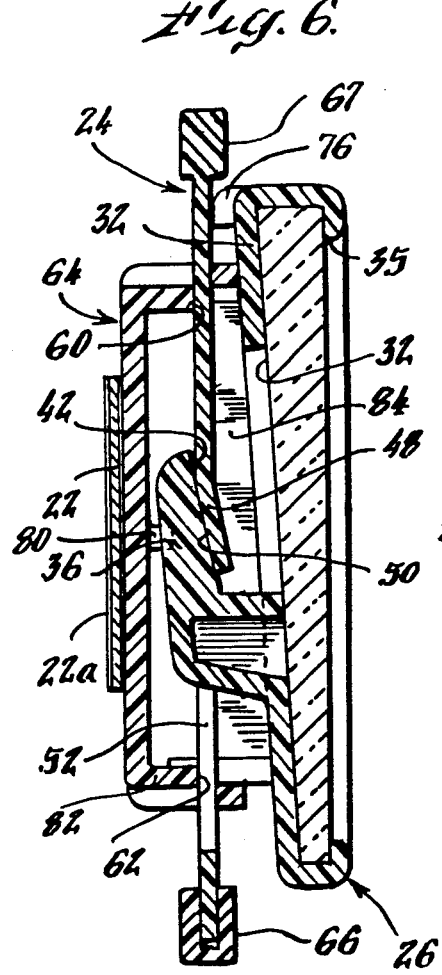

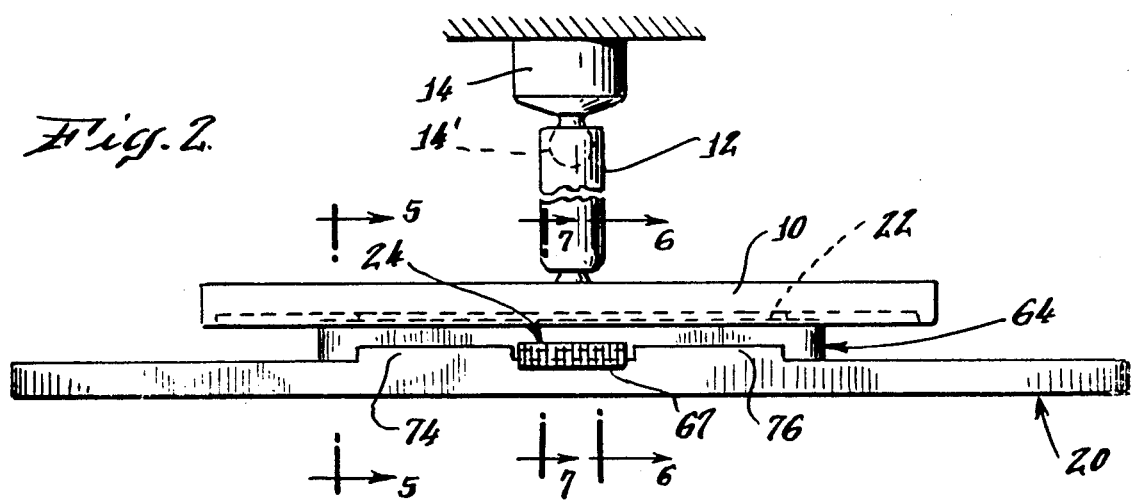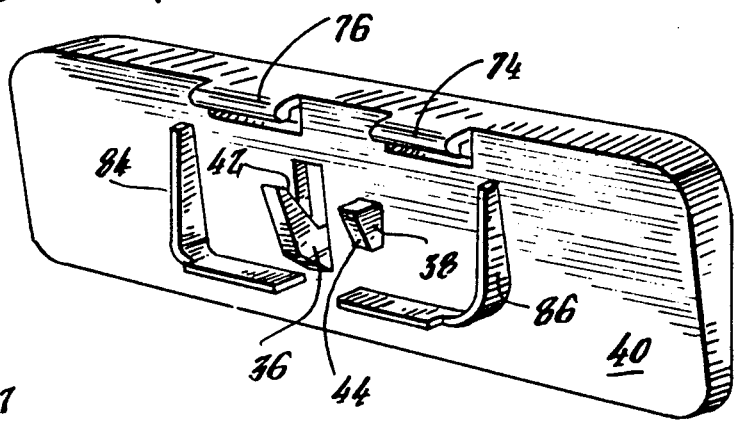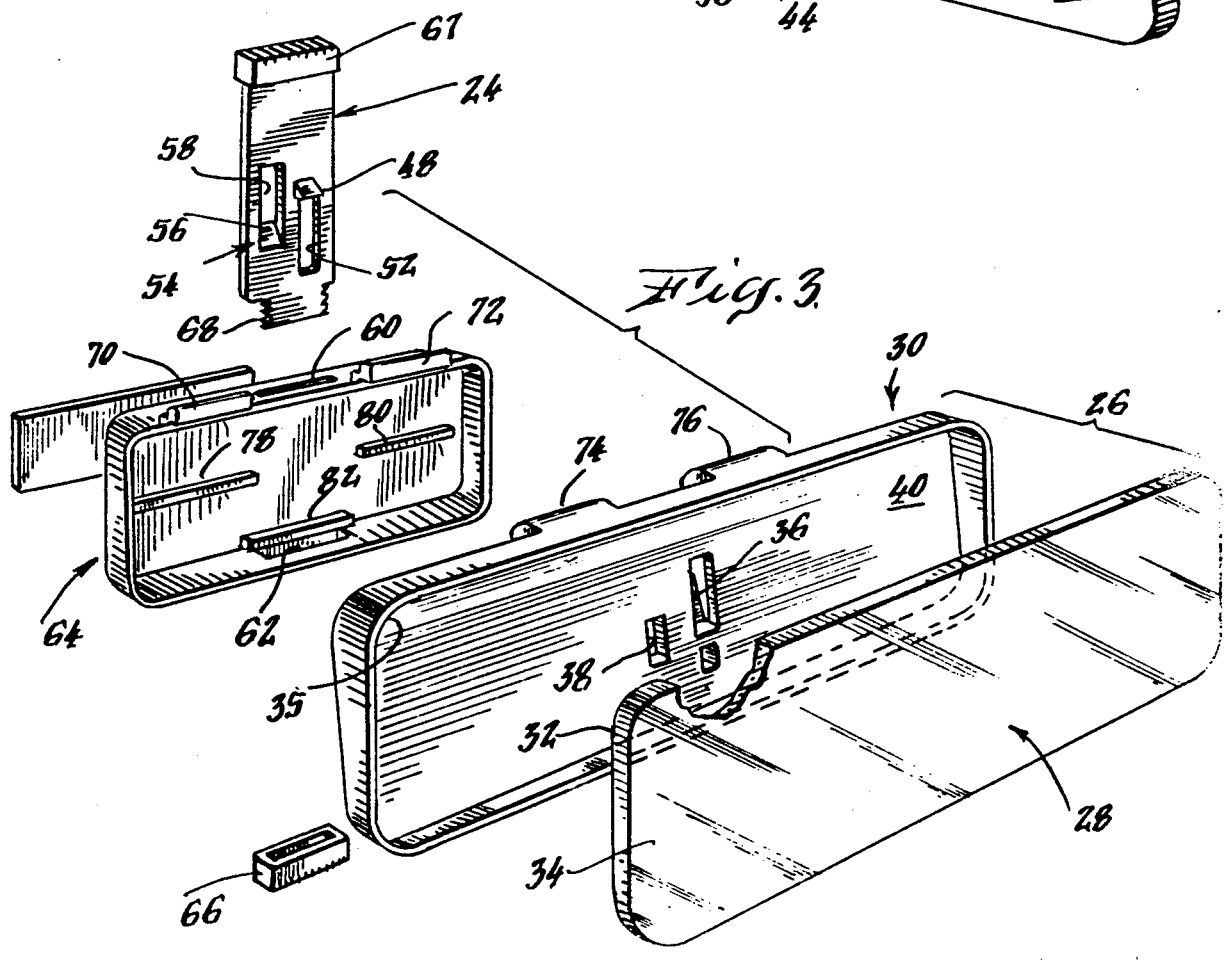

ATTACHABLE ANTIGLARE REAR VIEW MIRROR

This invention relates to a rear view mirror of the antiglare, or "day and night", type; and, more particularly, to such a mirror which is readily attachable to a supporting surface of a vehicle, for instance to the face of a simple rear view mirror present in the vehicle, to provide either a normal viewing position for normal driving conditions or a glare-reducing position for relief from reflected glare of headlights or other bright objects behind the vehicle.

Many different forms of antiglare or dual-position rear view mirrors for use in motor vehicles are known. Examples of them may be seen, for instance, in U.S. Pat. Nos. 2,910,915, 3,026,771, 3,029,701, 3,076,384, 3,439,977, 3,472,580, 3,508,815, 3,522,987, 3,525,564, 3,561,848, and 4,281,898. The known forms of such mirrors are typically mounted through a ball-and-socket joint directly to a supporting bracket fixed to the vehicle body. Their mirror units, which may be either prismoidal reflecting panels or sets of transparent and reflecting panels arranged at angles to each other, are tiltable between normal and glare-reducing positions by movement of a finger piece located within reach of the driver's hand. The finger piece and related movable parts in commercial forms of such mirrors typically involve the application of forces which are easily resisted by the fixed mounting bracket of the mirror.

Many motor vehicles as manufactured and sold are equipped with simpler, less-costly rear view mirrors that have single, flat reflecting panels fixed in frames mounted to fixed supports through ball-and-socket joints. The safety feature of an antiglare mirror is not available to drivers of vehicles so equipped.

A principal object of the present invention is to provide a rear view mirror assembly of the antiglare, or dual-position, type which is readily attachable to a supporting surface of a vehicle, such as the face of an existing rear view mirror of the simple reflecting type, so that the safety feature of a glare-reducing mirror position may be easily provided in vehicles not equipped with an antiglare mirror.

A further object of the invention is to provide a relatively simple and economical finger-operable mechanism for positioning the mirror unit of a rear view mirror of the antiglare type, and one by which simple up-and-down finger pressures on a mirror positioning member will effect the required tilting movements of the mirror unit without exerting forces that would tend to move the mirror unit away from its support.

These and other objects are achieved according to the present invention, which provides an antiglare motor vehicle rear view mirror assembly adapted for attachment to a support surface, comprising: a mirror unit operable between two angularly-displaced reflective positions; first and second cam followers associated with said mirror unit; and cam lever means comprising first and second cams operable with said first and second cam followers for moving the mirror unit between the two operable positions.

The mirror assembly preferably includes adhesive strip means to secure the assembly to a support. And, the cam followers are preferably located on the rear wall of the mirror unit such that vertical movement of the cam lever pivots the mirror unit between the two angularly-disposed operable positions. This simple vertical actuating movement minimizes forces tending to displace the mirror assembly from the support, and makes the provision of a "day or night" safety mirror practical for motor vehicles not originally equipped with such a mirror.

The invention will be better understood and its advantages will become more apparent from the following detailed description, especially when read in light of the accompanying drawings wherein:

FIG. 1 is a perspective view of an antiglare rear view mirror assembly according to the invention attached to a support in the preferred manner;

FIG. 2 is a top plan view of the mirror assembly shown in FIG. 1;

FIG. 3 is an exploded perspective view of a preferred mirror assembly according to the invention;

FIG. 4 is a rear perspective view of the mirror unit employed in the mirror assembly shown in FIG. 3;

FIG. 5 is a cross section taken along line 5—5 in FIG. 2;

FIG. 6 is a cross section taken along line 6—6 in FIG. 2; and

FIG. 7 is a cross section taken along line 7—7 in FIG. 2, with the mirror unit shown tilted to the antiglare position.

As is clear from the drawings, the mirror assembly provided according to the present invention is simple in design and construction. The following description will make it apparent that its operation is simple as well. The ease of movement of the mirror unit between day and night positions by the vertically-movable, finger-activatable mechanism enables the use of an adhesive strip to secure the assembly to the face of an existing single-position mirror. By thus permitting long-term, sturdy attachment by adhesive, installation is made an extremely simple operation. And, the ability to attach it to an existing mirror enables the mirror assembly of the invention to have the same degree of ball-and-socket freedom of movement as the existing equipment.

Reference is now made to FIGS. 1 and 2 which show a preferred form of mirror assembly, shown generally as 20, attached for use. FIG. 2 shows adhesive strip means 22 securing the assembly 20 to the face of original equipment mirror 10. The original equipment mirror 10, with this mirror assembly 20, is adjustable by turning its support arm 12 about the center of a ball-and-socket joint 14' converting arm 12 with a base support 14 on the vehicle body. The adhesive strip 22 is preferably an adhesive tape of the "two-sided" type, comprising a strip of material such as a polyurethane or nylon foam having pressure sensitive adhesive applied to both sides. One side of such a tape can be adhered directly to the back side of the cam lever housing 64 hereinafter described.

As packaged, prior to attachment to the mirror 10, the side of the tape intended for attachment will typically be covered with a release sheet 22a (FIGS. 5–7). In order to attach the mirror assembly 20, the release sheet is simply removed from the back of strip 22 and the strip is pressed against the face of original equipment mirror 10. It is an advantage of the present invention that the mirror assembly 20 can be easily adjusted between the day and night positions by simply moving cam lever 24 with fingertip pressure in a direction parallel to the adhesive surfaces of tape 22. This minimizes any tendency for the strip holding the assembly to be displaced.

The mechanism according to the invention which enables the simplified attachment to a support and ease of operation is shown in an exploded perspective view in FIG. 3. The mirror unit, shown bracketed as 26 in FIG. 3, comprises a prismoidal mirror 28 and a mirror casing 30. The prismoidal mirror 28 is shown to have reflective surface 32 and front surface 34, which are angularly displaced from each other. Reflective surface 32 is a conventionally-silvered mirror surface having a high degree of reflectivity and is intended for use during daytime driving and shown in operative position in FIGS. 5 and 6. The mirror is shown in FIG. 7 to be in the antiglare position, permitting the glare of headlights at night to be decreased so as to protect the driver from the decrease in visual acuity associated with such bright lights under otherwise darkened conditions. As an alternative to the use of a prismoidal mirror such as shown in the drawings, two separate flat elements (not shown) can be held within mirror casing 30 at an appropriate angular displacement as are the surfaces 32 and 34 of prismoidal mirror 28.

The mirror casing 30 is preferably made of a plastic material such as polypropylene or acrylonitrile-butadiene-styrene copolymer (ABS) resin which can be softened and reshaped at elevated temperatures. The use of a material of this type permits insertion of the prismoidal mirror within the mirror casing 30 and folding over the outer edge 35 of the mirror head 30 to hold the prismoidal mirror 28 therein. This is shown clearly in the cross-sectional view of FIGS. 5, 6 and 7.

Viewing the inside of the mirror casing 30 as seen in FIG. 3, the inner sides of first and second cam followers 36 and 38 can be seen. As shown in FIGS. 3 and 4, cam followers 36 and 38 are integrally molded with the rear wall 40 of mirror casing 30 which forms part of the mirror unit 26. As can be best seen in FIGS. 6 and 7, both the first cam follower 36 and the second cam follower 38 comprise inclined cam-following surfaces 42 and 44, respectively. The first cam-following surface 42 of first cam follower 36 is spaced from and faced towards the rear wall 40 of the mirror unit. The second cam follower 38 is shown to comprise a second cam-following surface 44 that faces outwardly from the rear wall 40 of the mirror casing 30. Both cam-following surfaces 42 and 44 are inclined from positions farther from rear wall 40 at their tops to positions closer to rear wall 40 at their bottoms.

The cam followers discussed above are operable for actuation by cam lever 24 and associated cams 48 and 54 to pivot the mirror unit 26 between two operable positions, one for day and one for night. Specifically, FIG. 6 shows the relationship between the first cam follower 36 and the first cam 48 to position the mirror unit 26 in the daylight position wherein reflective surface 32 is in position to enable the user to see behind him through the vehicle rear window. And, FIG. 7 shows the relationship between second cam follower 38 and the second cam 54 for holding the mirror unit 26 in the antiglare position to protect the eyes of the user from the glare of bright lights while driving at night. FIGS. 6 and 7 reveal that moving the cam lever 24 vertically downward, positions the mirror unit 26 in the daylight position; whereas, moving the cam lever 24 vertically upwardly positions the mirror unit 26 in the night or reduced-glare position.

Both first and second cams 48 and 54 comprise inclined camming surfaces, identified as 50 and 56 respectively, adapted to engage first and second cam-following surfaces 42 and 44, respectively. The first camming surface 50 extends inwardly from the rear surface of the cam lever 24 from a line of juncture with the rear surface 40 at the top of the first camming suface 50 and above an opening 52 in the cam lever 24. The opening 52 is adapted to receive the first cam follower 36 to permit downward movement of cam lever 24 and sliding contact between cam-following surface 42 and camming surface 50 to position the mirror unit in the daylight position as shown in FIG. 6.

The second camming surface 56 extends upwardly and rearwardly from the front surface of the cam lever means 24 from a line of juncture with said rear surface 40 at the bottom of the second camming surface 56 below opening 58 in the cam lever 24. The opening 58 is adapted to receive the second cam follower 38 which will fully extend through the opening 58 when the mirror unit is in the daylight position. Movement of the cam lever 24 vertically upward to the position shown in FIG. 7 causes second camming surface 56 to slidably engage second cam-following surface 44 and thereby incline mirror unit 26 to the night position. This movement also partially displaces the cam follower means 36 and 38 from within the openings 52 and 58, respectively, as the mirror unit 26 pivots from the daylight position shown in FIG. 6 to the night position shown in FIG. 7.

Cam lever 24 fits through slots 60 and 62 in cam lever housing 64. A cam lever cap 66 is shown for fitting on the lower end 68 of cam lever 24, enabling the cam lever to be moved by simple finger-tip pressure. A molded upper end 67 of the cam lever has a serrated upper surface and serves as a finger piece for pushing the cam lever downward. Cam lever housing 64 is also shown to include fulcrum means 70 and 72 about which the mirror unit 26 can be pivoted. Reference to FIG. 4 shows support means 74 and 76 which engage the rounded upper surfaces of fulcrum means 70 and 72, respectively, to form hinges. As an alternative to the mechanical hinges formed by fulcrum means 70 and 72 in combination with support means 74 and 76, an integrally-molded plastic hinge (not shown) can be formed during the procedure for molding either the mirror head 30 or the cam lever housing 64 and then attached as a part of the assembly procedure.

Rib members 78, 80, 82, 84 and 86 provide strengthening of the plastic wall portions to which they are attached. In addition, members 84 and 86 telescope within the outer wall portions of cam lever housing 64 to restrict lateral movement of the mirror unit 26.

The cam lever housing 64 is preferably a unitary structure composed of a suitable thermoplastic resin, such, for example of an acrylonitrile-butadiene-styrene copolymer (ABS) resin molded to a wall thickness of about 0.08 inch. The cam lever 24 is peferably molded in a single piece from a suitable plastic material such as that employed for the housing. The cam lever can, if desired, be formed from a single dye-stamped piece of aluminum having, for instance a thickness of about 0.05 inch and a width of about 1.125 inches. The mirror will preferably be glass having a shatter-proof coating over the front surface. The two surfaces 32 and 34 of the mirror will preferably be angularly displaced at an angle of from about 2° to about 10°, preferably at an angle of about 3°.

The above description is presented for the purpose of teaching the person skilled in the art how to make and use the present invention. It is not intended to mention each and every obvious modification or variation of the invention. However, it is intended that all such modifications and variations be included within the scope of the present invention which is defined by the following claims.

What is claimed is:

1. An antiglare motor vehicle rear view mirror assembly comprising:
   a mirror unit operable between two angularly-displaced reflective positions;
   first and second cam followers associated with said mirror unit; and
   a cam lever comprising first and second cams operable with said first and second cam followers to move said mirror unit between said operable positions, said cam followers being formations on a rear wall of said mirror unit.

2. An antiglare mirror assembly according to claim 1 wherein said mirror unit is pivotally engaged with a housing that supports said cam lever and encloses said first and second cams, said cam lever being vertically actuatable to move said cams within said housing to pivot said mirror unit between said operable positions.

3. An antiglare mirror assembly according to claim 2 wherein said first and second cam followers comprise cam following surfaces inclined from positions farther from said rear wall of said mirror unit at their tops, to positions closer to said rear wall at their bottoms; said first cam follower comprises a cam-following surface that at its top is spaced from and faced toward said rear wall and at its bottom is fixed to said rear wall; and, said second cam follower comprises a cam-following surface that faces outwardly from said rear wall.

4. An antiglare mirror assembly according to claim 3 wherein: said first and second cams comprise inclined camming surfaces adapted to engage said first and second cam-following surfaces, respectively; said first camming surface extends inwardly from the rear surface of said cam lever from a line of juncture at the top of said first camming surface and above an opening in said cam lever adapted to receive said first cam follower; and said second camming surface extends rearwardly from the front surface of said cam lever from a line of juncture at the bottom of said second camming surface and below an opening in said cam lever adapted to receive said second cam follower.

5. An antiglare mirror assembly according to claim 4 that further includes hinge means attached to the tops of both said mirror unit and said housing.

* * * * *